Figure 1:
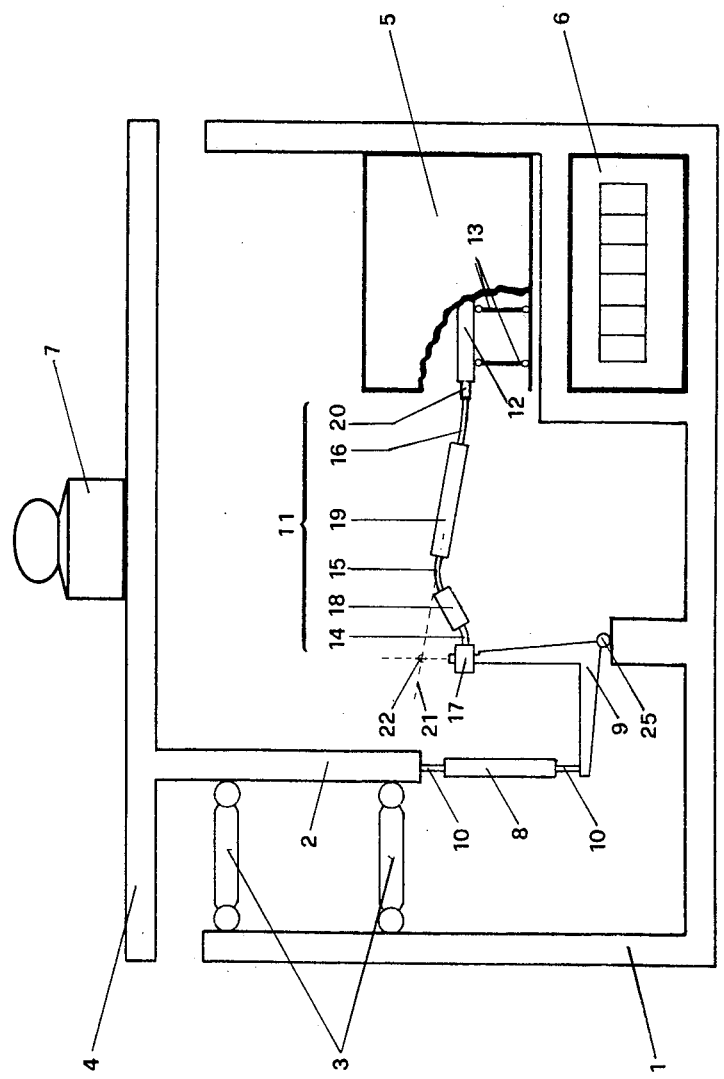

United States Patent [19]

Saner et al.

[11] 4,270,384

[45] Jun. 2, 1981

[54] MASS AND FORCE METER

[75] Inventors: Kaspar Saner, Dübendorf; Johannes Wirth; Mario Gallo, both of Zurich, all of Switzerland

[73] Assignee: Wirth, Gallo & Co., Zurich, Switzerland

[21] Appl. No.: 969,818

[22] Filed: Dec. 15, 1978

[30] Foreign Application Priority Data

Jan. 26, 1978 [CH] Switzerland .......................... 835/78

[51] Int. Cl.³ ............................................. G01L 1/10
[52] U.S. Cl. ............................ 73/862.59; 73/DIG. 1; 177/210 FP
[58] Field of Search ............... 73/141 R, DIG. 1, 580, 73/581, 517 AV; 177/210 FP

[56] References Cited

U.S. PATENT DOCUMENTS

| 3,621,713 | 11/1971 | Wirth et al. | 73/DIG. 1 |
| 3,724,572 | 4/1973 | Saner | 177/210 FP X |
| 4,070,900 | 1/1978 | Engels | 177/210 FP |
| 4,088,014 | 5/1978 | Wirth et al. | 73/DIG. 1 |

FOREIGN PATENT DOCUMENTS 2360965 6/1975 Fed. Rep. of Germany ...... 73/DIG. 1

Primary Examiner—Charles A. Ruehl
Attorney, Agent, or Firm—Stevens, Davis, Miller & Mosher

[57] ABSTRACT

A mass and force meter locked over its measuring system and comprising a frame, a load support, and a force transmission channel with a load-dependent force transmission ratio and at least one swivel lever is provided, in which the combination of the non-linearity of the measuring system with that of other elements of the meter can be eliminated with a force transmission channel having a non-linear characteristic, such a channel having a smaller resilience than the known meters coupled with a better adaptability to meeting the requirements for the parameters determining the non-linearity to be eliminated and with easy adjustment of these parameters, the swivel lever being connected with at least one adjacent element of the force transmission channel by means of a link having one of its ends fitted to the swivel lever, the link being mounted at least partly outside the action line of the force transmitted and being at least zone-wise elastically bendable.

2 Claims, 12 Drawing Figures

MASS AND FORCE METER

The invention relates to a mass and force meter locked over its measuring system, with a frame, a load support, and a force transmission channel with load-dependent force transmission ratio having at least one swivel lever, for instance a scale with vibrating strings. Meters locked over their measuring system are devices having a measuring system which compensates the load and allows only for virtual movements of the elements of the force transmission channel. Scales having a measuring system comprising two vibrating strings loaded by a reference force and by a force proportional to the load to be measured are typical examples of meters locked over their measuring system.

Mass and force meters of this type are known for example from Swiss Pat. Nos. 492 961 and 541 799. Their force transmission channels are called non-linear because the output force acting on the measuring system, i.e. the so-called measuring force, is not a linear function of the input force to this channel, i.e. the load to be measured, a force or a mass. This property exists by design and has the purpose of compensating for the non-linear characteristic of the measuring system or rather of the two dynamometers forming the measuring system.

Known mass and force meters present a lever having one arm the length of which varies as a function of the magnitude of the measuring force. Although such linearizing systems can be built with a linear characteristic, it requires long displacements of the load support relative to the length variations of the lever arm. The very small variation of the effective arm length must be achieved with a long displacement in direction of the input force, which is clearly undesirable. The possible linearizing of non-linear characteristics of the measuring system is in practice limited to errors of the 3rd order, whereby the adjustment facilities are deficient.

It is an object of the invention to provide a mass and force meter in which the combination of the non-linearity of the measuring system with that of other elements of the meter can be eliminated with a force transmission channel having a non-linear characteristic, such a channel having a smaller resilience than the known meters coupled with a better adaptability to meeting the requirements for the parameters determining the non-linearity to be eliminated and with easy adjustment of these parameters.

According to the invention this can be achieved by connecting the swivel lever with at least one adjacent element of the force transmission channel by means of a link having one of its ends fitted to said swivel lever, said link being mounted at least partly outside the action line of the force transmitted and being at least zone-wise elastically bendable.

Embodiments of the invention are represented schematically in the enclosed drawing.

Figure 2:
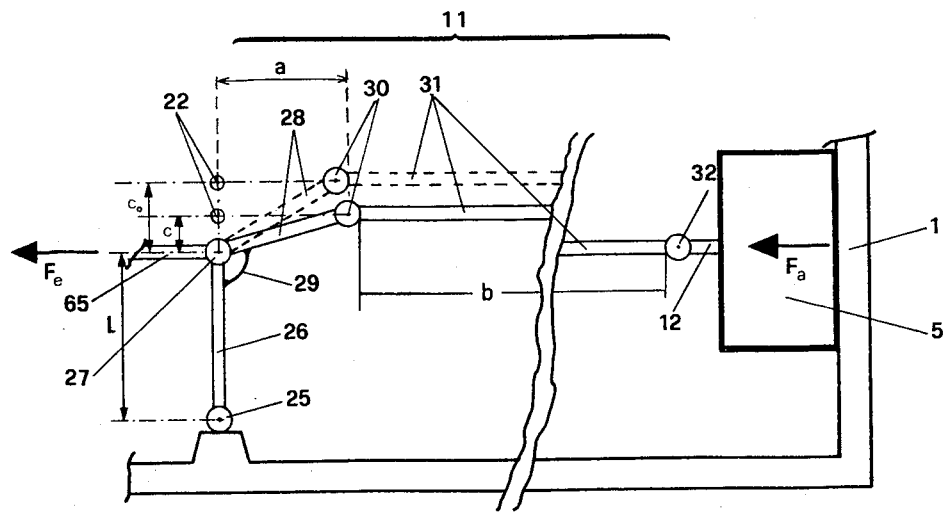
Figure 3:
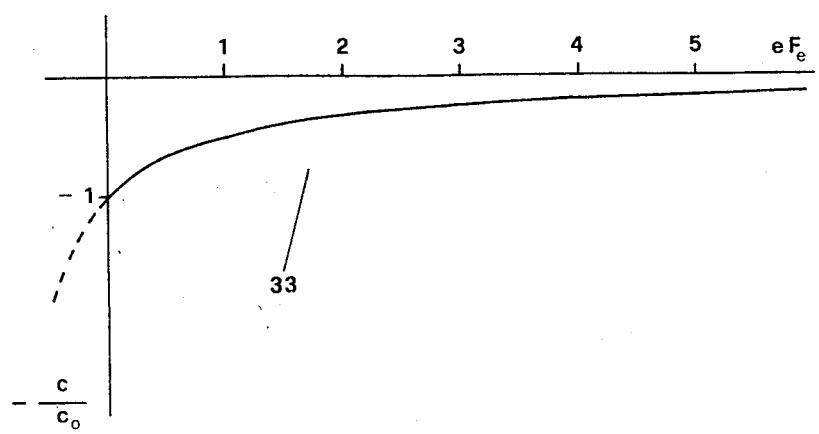
Figure 4:
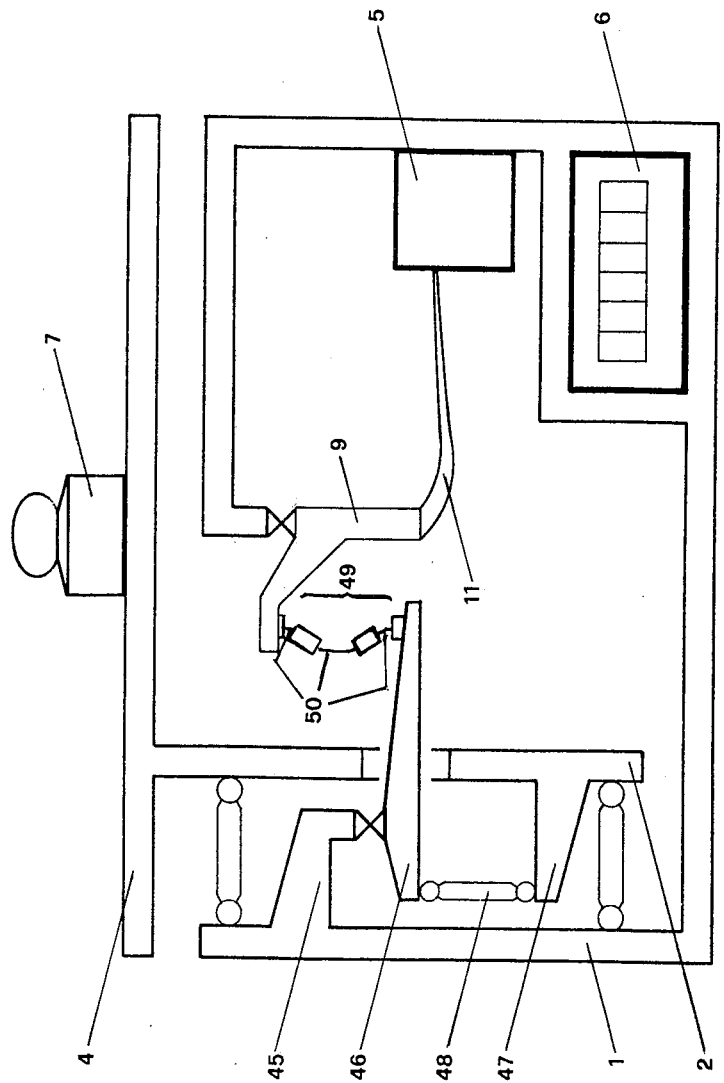
Figure 5:
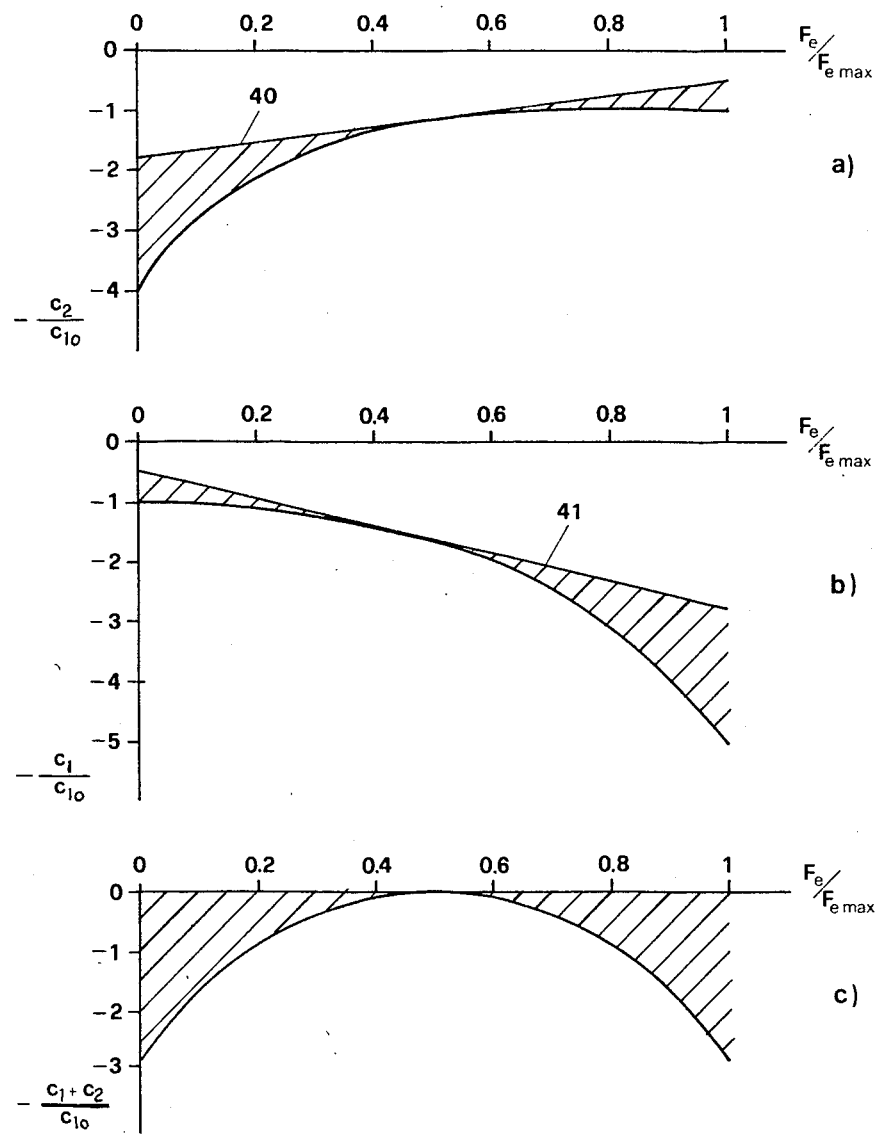
Figure 6:
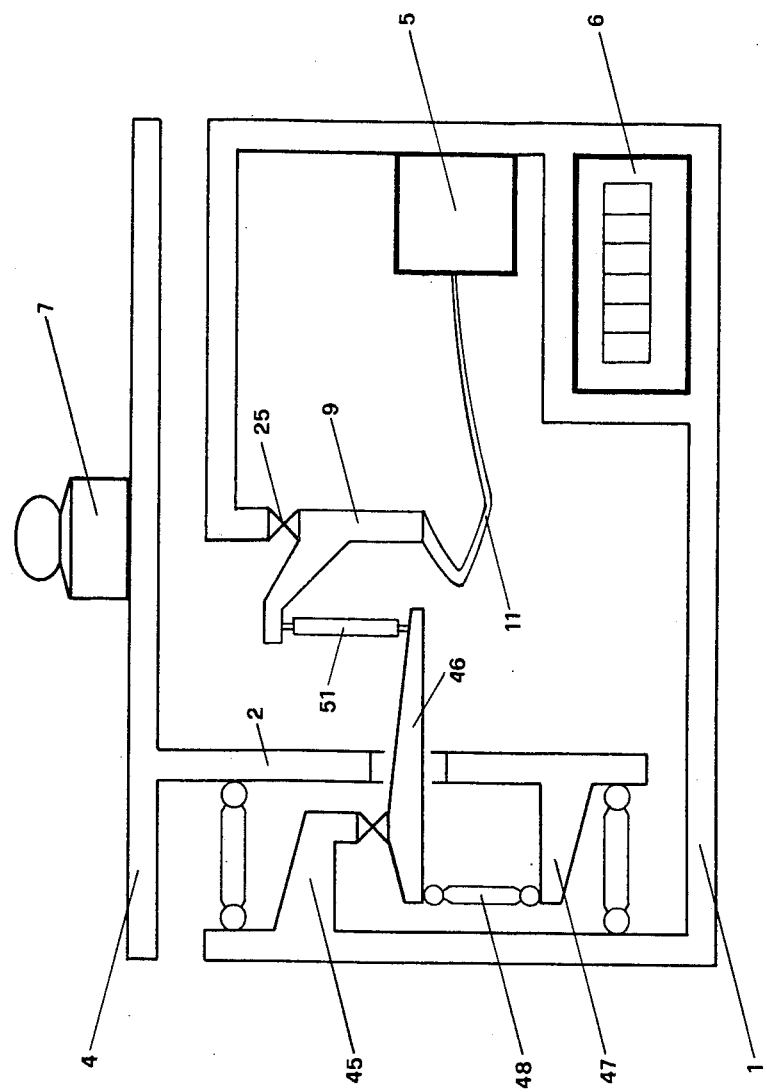

FIG. 1 is a first embodiment,
FIG. 2 is a schematic representation of FIG. 1,
FIG. 3 is a force transmission characteristic curve,
FIG. 4 is a second embodiment,
FIGS. 5a, 5b, 5c show force transmission characteristic curves corresponding to FIG. 4,
FIG. 6 is a third embodiment, and
FIGS. 7a, 7b show an implementation of the link.
FIGS. 8a, 8b show another implementation of the link.

In FIG. 1 a mass meter is schematically represented, which has a frame 1. A load support 2 is linked to frame 1 by means of two articulated guides 3 guiding load support 2 parallely in a vertical direction. A platform 4 is fixed to load support 2. The mass meter has furthermore a measuring system 5 and a computing and display unit 6. The weight of a mass 7 to be measured is transmitted by means of a pressure rod 8 to the horizontal arm of a swivel lever 9 mounted in articulation 25 on frame 1. At both its ends pressure rod 8 has elastic articulations 10. The vertical arm of lever 9 transmits the force acting on it, multiplied or reduced as the case may be, to an input element 12 of measuring system 5 by means of a link 11. Input element 12 is parallely guided by means of two guides 13 so that it can transmit only traction forces to measuring system 5, all moments being absorbed by frame 1.

Link 11 comprises a bar with a rectangular cross-section divided by three section reductions 14, 15 and 16 into four flexion-resistant sections 17, 18, 19 and 20. Section 17 has a hole in which the upper end of the vertical arm of lever 9 is pressed, this fitting of the two parts to each other allowing forces as well as moments to be transmitted to link 11. Section 20 is cylindrical, and is fitted into a hole of input element 12, so that at this end of the transmission channel too, forces, and moments are transmitted, the latter forces and moments being directed to frame 1 and not transmitted to measuring system 5, as already mentioned. Reductions 14, 15, 16 form flexure-resilient articulations which are under the action of the forces and moments transmitted by lever 9 to section 17. Link 11 is designed so that the axes of reductions 14, 15, 16 do not fall on the same straight line. Reductions 15, 16 are quite thinner than reduction 14, so that the reset moments they may exert can be neglected in a first approximation.

Link 11 works as follows: when platform 4 is empty the action line 21 of the force acting upon input element 12 is almost identical with the axis of section 19 of link 11. Line 21 intersects the prolongation of the axis of the vertical arm of lever 9 at a point 22. At this point 22 the moment acting on lever 9 is transformed into a traction force acting upon section 19. When a mass 7 is put on platform 4, link 11 tends to take a flattened form under the action of the forces and moments generated by the weight of mass 7, and point 22 is displaced downwards. The force acting on input element 12 does not increase proportionally to the weight of mass 7 but only by an amount which is determined by the reduction of the effective vertical length of lever 9.

FIG. 2 is a schematical representation of lever 9, link 11 and input element 12 according to FIG. 1, intended for explanation purposes only. A rod 26 of length L, which is rotatably mounted in an articulation 25, has the function of lever 9 of FIG. 1. At its upper end, one end of a traction rod 65 is rotatably mounted in articulation 27, so that it is not submitted to moments, said rod 65 exerting a traction force Fe on link 11. This force Fe corresponds to the force exerted by lever 9 on section 17 (FIG. 1). A further rod 28 is rotatably mounted in articulation 27, which represents section 18 of FIG. 1. Reduction 14 of FIG. 1 is replaced by rod 28 and a spring 29 which maintains rod 28 in the position indicated by dotted lines when Fe=0. The effective length of rod 28 is indicated with a, the height of an articulation 30 at the end of rod 28 over articulation 27 is indicated with c. A rod 31 replaces section 19 of FIG. 1. This rod 31 is rotatably mounted in articulation 30, so that it does not receive any moment, in an articulation 32 it is rotatably fixed to input element 12 of measuring system 5, it exerts a traction force Fa on measuring system 5.

The length b of rod 31 is much larger than length a, so that in a first approximation, rod 31 can be considered as being always horizontal. This means that force Fa also acts on point 30, as its action line can be considered as intersecting the prolongation of the axis of rod 26 in point 22. The equation of the moments acting upon rod 26 is as follows:

$$Fe \cdot L = Fa(L+c) \tag{1}$$

Assuming that the angle of rod 28 is small and does not vary much the variation of inclination of rod 28 under the action of force Fe is:

$$\alpha \simeq \frac{c_o - c}{a} \tag{2}$$

The rotation hardness (moment-to-angle ratio) of spring 29 being k, the relation in articulation 27 is:

$$k \frac{c_o - c}{a} = Fa \cdot c \tag{3}$$

Let $e = a/k$, so:

$$c = \frac{c_o}{1 + eFa} \tag{4}$$

Combining (1) and (4):

$$Fe = Fa \left(1 + \frac{c_o/L}{1 + eFa}\right) \simeq Fa \left(1 + \frac{c_o/L}{1 + eFe}\right),$$

i.e.:

$$\frac{Fa}{Fe} \simeq 1 - \frac{c_o/L}{1 + eFe} \tag{5}$$

Combining (4) and (5):

$$-\frac{c}{c_o} \simeq \frac{-1}{1 + eFe} \simeq \frac{Fa - Fe}{c_o/L \cdot Fe} \tag{6}$$

The relative variation of the height of articulation 30 is a direct measurement of the relative force difference at force input 12.

In FIG. 3 $c/c_o$ is represented in function of eFe. When the reliance e in articulation 27 is suitably selected, the linearizing characteristic curve of FIG. 3 can be modified by geometrical affinity so as to meet the correction task. The relation of eFe and $c/c_o$ is represented by a branch 33 of a hyperbola which runs only within quadrant IV. It is obvious that the relative force difference $(Fa-Fe)/(c_o/L \cdot Fe)$ is maximum for small values of Fe. When Fe increases this relative difference becomes less and less important. The difference (Fa−Fe) acts in articulation 25 as a reaction force parallel to force Fe. The part of the curve represented by a dotted line in quadrant III represents the behaviour of link 11, would Fe be negative, a situation which cannot arise in the mass meter according to FIG. 1.

In FIG. 4 a second embodiment is represented. Frame 1 has an arm 45 on which a lever 46 is mounted by means of an elastic articulation. Load support 2 has an arm 47 linked by means of a traction rod 48 with the short arm of lever 46. The traction force exerted by the weight of mass 7 is transmitted by a link 49 acting as a pressure rod and as a force reducer. Link 49 comprises a cylindrical bar having three reductions 50, obtained for instance by milling and which operate as elastic articulations. Link 49 is fitted to swivel lever 9 and to lever 46. It transmits therefore not only the reduced weight of mass 7 but also moments. Link 49 is bent so that its axis does not fall on the line linking the points where it is fitted to levers 9 and 46, the axes of reductions 50 also do not fall on the same line. When the load increases, link 49 is bent more and more to the left, so that the action line of the force transmitted also moves to the left. The transmission ratio of lever 9 is modified in function of the load at a higher rate than that of lever 46 which has a longer arm.

In a particular implementation of link 49, that reduction 50 which is nearest to lever 9 is thicker than the other two reductions 50 and therefore more resistant to flexion. In this case also the direction of the action line of the transmitted force is changed. Link 11 is fitted to lever 9. It comprises an elongated, slightly curved element without the reductions shown in FIG. 1. The correction function of this link 11 corresponds substantially to FIG. 1, 2, 3 and 5a. The correction function of link 49 is represented in FIG. 5b and is superimposed to the first one, so that the resulting transmission characteristic is dominated by a term of 2nd order, as shown in FIG. 5c, up to a constant term. Link 11 acts on measuring system 5, which, as in FIG. 1, accepts only traction forces and directs to frame 1 all moments and/or forces with an oblique line of action.

In FIG. 6 a variant to FIG. 4 is represented. Instead of link 49 a stiff rod 51 with articulations at its ends is mounted so as to transmit the reduced weight of mass 7 from lever 46 to lever 9. Link 11 is fitted to lever 9. When the transmitted force is small, that part of link 11 which is curved downwards is stretched first, so that the action line of force Fa, which acts upon measuring system 5, comes nearer to articulation 25 of lever 9. When the load transmitted increases the curved part of link 11 which is fixed to lever 9 is stretched and said action line moves away from point 25.

For the sake of clarity of the drawings the amount of flexion of link 11 from the line linking the end of the vertical arm of lever 9 to force input 12 has been shown largely exaggerated. In reality this flexion represents a few percent of the total length of link 11. The rotation of lever 9 when link 11 is stretched is very small, it is of the order of magnitude of the limited resiliance of measuring system 5.

Figure 7:
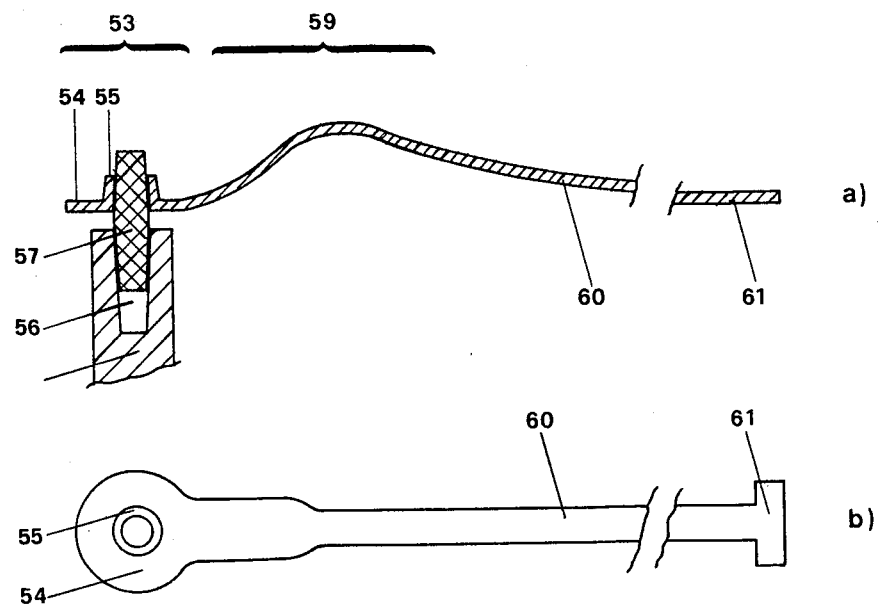
Figure 8:
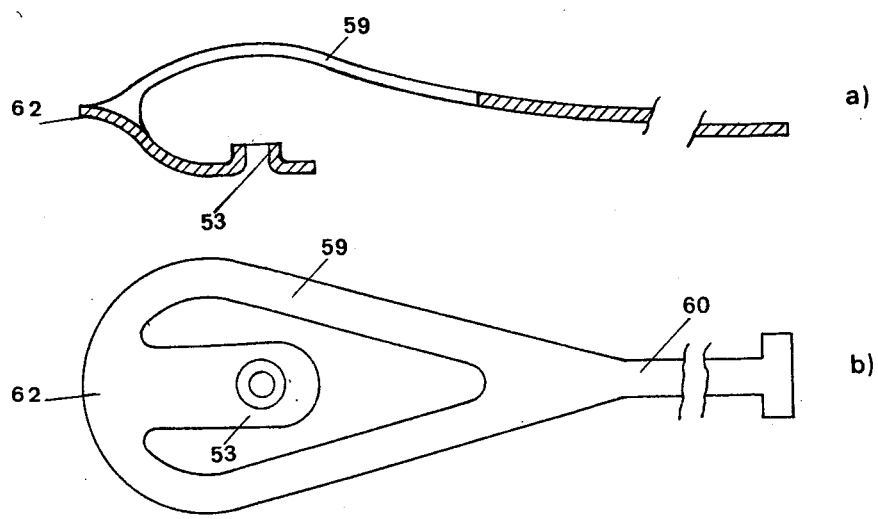

FIGS. 7a and 7b show an implementation of link 11 as schematically represented in FIG. 1, FIG. 7a is a cross-section and FIG. 7b is a view from above. In FIG. 7 link 11 comprises a fitting part 53, a curved middle part 59 and a long, practically flat band 60. Fitting part 53 consists of a flat collar 54 and of a cylindrical collar 55. A pin 57 tapered at both ends is pressed into a hole 56 of vertical arm of lever 9. Pin 57 can be made with a highly resistant, isolating material, for instance sapphire. Cylindrical collar 55 is pressed onto pin 57. Thanks to this fixation—hole 56, pin 57, collar 55—lever 9 can transmit to link 11 forces as well as moments. The middle part 59 of link 11 is relatively broad, but band 60 is narrow and long compared to part 59, for instance 8 times longer. The end 61 of band 60 is fixed to force input 12 of measuring system 5 not shown here. The middle 59 could have the same width as band 60, also a zone with reduced width could be foreseen as a flexion-resilient element at the transition between part 59 and band 60.

FIGS. 8a and 8b show another implementation of link 11, FIG. 8a being again a cross-section and FIG. 8b a view from above. Link 11 is formed by punching followed by pressing, as for FIG. 7, so that the final form is obtained. The parts are the same as in FIG. 7: fitting part 53 for the same type of fixation, middle part 59 and band 60. That zone of link 11 nearest to the fixation point extends in the direction opposed to the direction of the force transmission. Link 11 being bent by about 180° middle part 59 extends in the direction of the force transmission. Due to the form chosen a hard flexion articulation is formed at fixation point 53 and another one indicated by 62 is formed at the left end of link 11. The other parts, in particular band 60, are resilient, so that the force transmission curve shown in FIG. 5c is obtained.

We claim:

1. In a mass and force meter, a frame, a load support, a measuring system locking the meter, a force transmission channel with a load-dependent force transmission ratio comprising a number of elements, at least one of said elements being a swivel lever, said swivel lever being connected to at least one adjacent element by means of a link, said link being fitted to said swivel lever, said force transmitted by said force transmission channel having an action line, said link extending at least partly outside said action line, said link being a traction band comprising a bar, said bar having three reduced sections, said reduced sections defining a first, a second and a third flexion resilient zone and four flexion-resistant zones, said first flexion-resilient zone being the first zone encountered in direction of the force transmission, said second and third flexion-resilient zones having a higher resilience than said first flexion-resilient zone.

2. In a mass and force meter, a frame, a load support, a measuring system locking the meter, a force transmission channel with a load-dependent force transmission ration comprising a number of elements, at least one of said elements being swivel lever, said swivel lever being connected to at least one adjacent element by means of a link, said link being fitted to said swivel lever, said force transmitted by said force transmission channel having an action line, said link extending at least partly outside said action line, said link being a flat traction band, said band comprising a flattened fixation part, a middle part, a section with a reduced width, and an elongated end part.

* * * * *